(12) United States Patent
Göpfert et al.

(10) Patent No.: US 11,639,877 B2
(45) Date of Patent: May 2, 2023

(54) CALORIMETER WITH MULTIPLE HEAT SINKS AND AN AMPLIFIER

(71) Applicant: Calbact AG, Kaiseraugst (CH)

(72) Inventors: Beat Göpfert, Frenkendorf (CH); Vinzenz von Tscharner, Samedan (CH)

(73) Assignee: Calbact AG, Kaiseraugst (CH)

(*) Notice: Subject to any disclaimer, the term of this patent is extended or adjusted under 35 U.S.C. 154(b) by 169 days.

(21) Appl. No.: 16/617,283

(22) PCT Filed: Jun. 1, 2018

(86) PCT No.: PCT/EP2018/064411
§ 371 (c)(1),
(2) Date: Nov. 26, 2019

(87) PCT Pub. No.: WO2018/220153
PCT Pub. Date: Dec. 6, 2018

(65) Prior Publication Data
US 2021/0131881 A1 May 6, 2021

(30) Foreign Application Priority Data
Jun. 2, 2017 (EP) .................................... 17174322

(51) Int. Cl.
*G01K 17/02* (2006.01)
*G01K 17/04* (2006.01)
*G01K 7/04* (2006.01)

(52) U.S. Cl.
CPC ............... *G01K 17/04* (2013.01); *G01K 7/04* (2013.01)

(58) Field of Classification Search
CPC combination set(s) only.
See application file for complete search history.

(56) References Cited

U.S. PATENT DOCUMENTS 4,492,480 A * 1/1985 Wadso ...................... G01K 1/16
165/169
5,186,540 A * 2/1993 Walsh .................. G01K 17/003
374/11

(Continued)

FOREIGN PATENT DOCUMENTS

GB          2093995 A       9/1982
KR     20120011002 A  *    2/2012    ............... H03H 7/24

OTHER PUBLICATIONS

Horowitz, Paul, and Winfield. Hill. "The Art of Electronics", 3rd ed.,Cambridge University Press, England. (Year: 2015).*

(Continued)

*Primary Examiner* — Lisa M Caputo
*Assistant Examiner* — Nasir U. Ahmed
(74) *Attorney, Agent, or Firm* — Hard IP LLC (57) ABSTRACT

A calorimeter for measuring a heat flux of a sample comprises a container, a first heat sink and a second heat sink whereby the sample is arranged in the container. The first heat sink and the second heat sink are arranged at a distance from each other on the container. The first heat sink comprises a first heat transducer element and the second heat sink comprises a second heat transducer element. Each of the first and second heat transducer elements comprise a heat receiving surface and a heat absorbing surface for generating an electromotive force equivalent to the heat flux to or from the respective heat sink to be sent to a detecting unit for obtaining an electrical potential representing the heat flux leaving or traversing the container.

13 Claims, 3 Drawing Sheets

(56) References Cited

U.S. PATENT DOCUMENTS

| | | | |
|---|---|---|---|
| 5,441,344 A * | 8/1995 | Cook, III | A47J 43/28 |
| | | | 374/141 |
| 5,707,149 A * | 1/1998 | Freire | G01K 17/00 |
| | | | 374/31 |
| 9,593,988 B1 | 3/2017 | Liberman et al. | |
| 2004/0107986 A1 | 6/2004 | Neilson et al. | |
| 2006/0034359 A1* | 2/2006 | Hauptmann | H03F 1/025 |
| | | | 375/222 |
| 2015/0219574 A1* | 8/2015 | Yao | G01N 25/482 |
| | | | 374/1 |

OTHER PUBLICATIONS

Translation of KR-20100080881-A (Year: 2010).*
International Application No. PCT/EP2018/064411, International Search Report dated Aug. 13, 2018, 3 pages.
Mckinnon et al., "Commercial Bismuth Telluride-based Peltier Plates for Use as Heat Flux Transducers (A Concept)", Forum, May 2010, pp. 32-36, Ecolibrium.
Braissant et al. "Isothermal Microcalorimetry for the Investigation of Clinical Samples: Past and Present", chapter 19, pp. 355-357.
International Application No. PCT/EP2018/064411, Written Opinion dated Aug. 13, 2018, 6 pages.

* cited by examiner

Fig. 1

Prior Art

CALORIMETER WITH MULTIPLE HEAT SINKS AND AN AMPLIFIER

CROSS-REFERENCE TO RELATED APPLICATIONS

This application is a U.S. national stage filing under 35 U.S.C. 371 of international patent application no. PCT/EP2018/064411, filed on Jun. 1, 2018, which claims priority to European patent application no. EP17174322.2, filed on Jun. 2, 2017, the contents of both of which are incorporated herein by reference in their entirety.

TECHNICAL FIELD

The invention relates to a calorimeter. Such a calorimeter can be used for the analysis of chemical or physiological processes which absorb or generate heat. Heat can be an indicator for a chemical reaction, a metabolic activity or a cellular function, e.g. a cellular function in micro-organisms. In the most general sense, a calorimeter is a device measuring the heat produced by a sample inside a container being used as a recipient of such a sample. An isothermal calorimeter is a calorimeter which continuously removes and simultaneously measures the heat produced in such a sample while keeping the temperature difference between the interior of the container and the external heat sink minimal, ideally close to zero. The heat produced corresponds to a heat flow which can be measured by a sensor, such as a contact temperature sensor, e.g. a thermometer, a thermo-electrical sensor, a thermistor, a transistor, a resistance temperature detector (RTD), a platinum resistance thermometer, a thermo-mechanical sensor, or a non-contact sensor, such as an infrared optical sensor, a diode.

Biological processes can produce heat in the range of less than 1 microwatt per milliliter sample volume, which requires a high thermal sensitivity of the sensor used, thus involving microcalorimetry, in particular isothermal microcalorimetry allowing the detection of heat energies in the Nanowatt range. The heat flux to be detected can be in the range of 1 nanowatt up to and including 1 milliwatt. Preferably the heat flux can be in the range of 0.1 microwatt up to and including 1080 microwatt.

DESCRIPTION OF RELATED ART

A thermistor is a type of sensor which can be used in microcalorimetry. A thermistor is a thermally sensitive resistor. In particular a negative temperature coefficient thermistor (NTC) can be used, which is characterized in that the resistance of the thermistor is inversely proportional to the temperature sensed by the thermistor. Thermistors are characterized by a high gain, which enables them to resolve very small temperatures in a given temperature range. However, the thermistors require extensive cleaning and sterilization between measurements, therefore such thermistors may not be suitable if a measurement on a multitude of samples has to be performed within a limited time period.

A thermoelectric element is a device that converts a current into a heat flow or a heat flow into a current making use of thermoelectricity. A thermocouple, which is a bimetallic sensor, makes use of this principle by producing an electrical potential difference proportional to the temperature difference between the two surfaces. Thermoelectricity describes the correlation between temperature and electricity. A thermoelectric element can be used for converting an electrical current into a heat flow, or a heat flow into a current. The conversion of a current into a heat flow is known as the Peltier effect, finding its application in a Peltier element. A Peltier element consists of two electrically conducting materials which are different from each other and which are connected with each other at one of each ends. The Peltier effect can be observed best if the electrically conducting materials are semiconductors. One of the electrically conducting materials is a p-type semiconductor, whereas the other electrically conducting material is a n-type semiconductor. An electric circuit including a battery is connected to the free ends of the p-type semiconductor and the n-type semiconductor. If the electric circuit is closed, electrons from the negative pole of the battery flow into the direction of the p-type semiconductor and move along inside this p-semiconductor by filling up the positive "holes" in this material until they arrive at the boundary between the p-type semiconductor and the n-type semiconductor. Due to the fact that in the n-type semiconductor, all available "holes" in the crystal structure have a negative polarity, the movement of the electrons is at least temporarily blocked by the boundary and requires energy to overcome this blockage. If the boundary is attached to a bridging heat exchange surface, such a bridging heat exchange surface cools as an energy input is required to deblock the electrons and "push" them through the n-type semiconductor to uphold the potential difference as applied by the electric circuit with the battery. On their way to the positive pole of the battery, the energy transported together with the electrons dissipates at the respective ends of the p-type semiconductor and the n-type semiconductor, whereby a heat flux is generated. If a heat exchange surface is provided at the source-sided ends of the p-type semiconductor and the n-type semiconductor, the temperature of this heat exchange surface rises, such that it becomes a hot surface.

If two different materials are connected at their ends together they can form a loop whereby the contact surfaces of the two materials are brought to different temperatures the thermoelectricity results in the generation of an electric circuit current. In case that the same arrangement of a p-type semiconductor and a n-type semiconductor is used, the heat supplied to the boundary connecting surface of the two semiconductors results in a thermodiffusion as the hot end of the p and n semiconductors contain more electrons of a higher energy which move towards the cold end and the cold end containing more electrons of a low energy moving to the hot end. This thermodiffusion results in a current difference also due to the use of different materials. In case the electrical circuit is interrupted, a potential difference results, which can be measured as a voltage, the Seebeck voltage. The Seebeck voltage is ideally roughly parallel to the temperature difference. A thermoelement can be used as a temperature sensor, provided it is calibrated accordingly.

A Peltier element can be used for the conversion of current into a heat flow. The inverse operation of a Peltier element results in a current generator, whereby by means of the Seebeck effect the heat flow can be converted into a current. If the electric circuit is interrupted this current results in a potential difference, which can be measured as a voltage. A thermoelement can be considered as a device generating an electromotive force and may be used as a sensor by measuring a voltage obtained from a current from a heat flow resulting from thermodiffusion.

A plurality of thermocouples can be combined to form a stack, a so-called thermopile. Such a thermopile is a multi-layer thermocouple, which can be used to measure a heat flow from a sample involving e.g. a biological process to a heat sink using a thermoelectric element as a sensor.

McKinnon et al. show in the article "Commercial Bismuth Telluride-based Peltier Plates for Use as Heat Flux Transducers (A Concept) by Clinton McKinnon, Ronald R. Bernardini, Wayne Thesher, Stuart L. Ruis, David W. Yarbrough that low-cost, commercially available bismuth telluride peltier plates can be used to measure the thermal performance of building elements and/or thermal insulation. The peltier plates are arranged around a sample containing a central transducer which is also a bismuth telluride module. The voltage obtained was about 270 mV without amplification and about 1300 mV with amplification. This means that such an apparatus appears to be unsuitable for any measurement in the range of picovolts ($10^{-12}$ Volts) resulting from heat flows attributed to e.g. bacterial activity in a sample.

The use of multi-channel calorimeters has been described in U.S. 2004/0107986. Such a multi-channel calorimeter comprises a plurality of wells arranged in an array, whereby each of the wells is configured as a sample container. The sample container comprises a bottom surface, which is configured to receive a thermal sensor, such as a thermistor. The thermistor is received in a corresponding recess of the bottom surface. The bottom surface is configured to provide minimal resistance to heat flow, therefore the wall thickness of the bottom surface is reduced with respect of the other wall surfaces of the well which are not in contact with any thermal sensor. A plurality of wells can be arranged in a regular pattern on the well plate to allow for parallel measurements.

A drawback of the known calorimeter is to be seen in the fact that it is expensive to manufacture and of a highly complex configuration. The heat of growing microorganisms, e.g. bacteria, were measured by sensors on the known calorimeter setting todays gold standard for the temporal detection of heat production. There is a need of optimizing the properties of the sensors and arranging the sensors in a more efficient way. A probe for microcalorimeter of a simplified configuration is disclosed in GB 2093995 A. The probe comprises a hollow cylindrical body for receiving the sample container, for instance an ampoule. The probe can be connected to heat transducers, which are configured as Peltier elements. However, an adapter part is required to provide a transition from the cylindrical jacket of the probe to the flat Peltier element. The probe, the adapter and the optional additional tube arranged on the jacket of the probe all contribute to heat dissipation. For this reason, the microcalorimeter GB 2093995 A is not considered suitable for measuring microorganism activity or other samples with a comparable heat generation.

SUMMARY OF THE INVENTION

It is thus an object of the invention to provide a device and a method for reducing the time required for completion of an analysis. In particular, it is an object of the invention to provide a device and method for obtaining a rapid result of microorganism activity in a substrate. It is a further object to capture the major portion of heat developed in the sample by the heat transducer element.

It is a further object of the invention to provide a calorimeter which needs much less complex electronics and is simple in its manufacture and easy to assemble.

It is a further object of the invention to provide a method for measuring the heat generated or absorbed by an energy source e.g. pathogens, cells or bacterial activity, by a calorimeter according to one of the preceding embodiments, whereby the measurement can be completed in a time frame of at most 8 hours, preferably at most 4 hours, most preferably at most 2 hours. According to an embodiment, the measurement can take at least 10 minutes. According to an exemplary embodiment, the measurement can last for at least 30 minutes. According to an embodiment the measurement period can extend from at last 10 minutes to at most 8 hours. According to an exemplary embodiment, the measurement period can extend from at least 30 minutes to at most 4 hours. According to a preferred exemplary embodiment, the measurement period can extend from at least 30 minutes to at most 2 hours.

It can be a further object of the invention to perform a measurement of the heat flux generated by cultivation of microorganisms and in particular the metabolism of microorganisms.

The problem is solved by a device according to claim 1. Further advantageous embodiments of the device are subject to the dependent claims.

If the term «for instance» is used in the following description, the term relates to embodiments or examples, which is not to construed as a more preferred application of the teaching of the invention. The terms "preferably" or "preferred" are to be understood such that they relate to an example from a number of embodiments and/or examples which is not to construed as a more preferred application of the teaching of the invention. Accordingly the terms "for example", "preferably" or "preferred" may relate to a plurality of embodiments and/or examples.

The subsequent detailed description contains different embodiments of the calorimeter according to the invention. The calorimeter can be manufactured in different sizes making use of different materials, such that the reference to a specific size or a specific material is to be considered as merely exemplary. In the description, the terms «contain», «comprise», «are configured as» in relation to any technical feature are thus to be understood that they contain the respective feature, but are not limited to embodiments containing only this respective feature.

Even if the calorimeter has been particularly applied for the cultivation of microorganisms and in particular the metabolism of micro-organisms, it is in no way restricted to any particular energy source. The sample to be measured can contain any energy source producing or absorbing heat.

A calorimeter for measuring a heat flux of a sample comprises a container, a first heat sink and a second heat sink. The sample is arranged in the container, whereby the first heat sink and the second heat sink are arranged at a distance from each other on at least one of the outer surfaces of the container. Each of the first and second heat sinks comprise a heat transducer element. The first heat sink comprises a first heat transducer element and the second heat sink comprises a second heat transducer element. Each of the first and second heat transducer elements comprise a heat receiving surface and a heat absorbing surface configured to generate an electromotive force equivalent to the heat flux to or from the respective heat sink to be sent to a detecting unit for obtaining an electrical potential representing the heat flux leaving or traversing the container. The heat flux can have a positive or negative value, depending on the nature of the energy source, which can be a heat source or a source of cold. The first and second heat transducer element are in direct contact with the container which contains the sample.

According to an embodiment, the container is supported by the first and second heat transducer elements. Advantageously, there is no other heat flux in or out of the container than through the first and second heat transducer elements.

The placement of the sample container between the first and second heat transducer elements allows in particular a measurement of the heat generated in the sample container in a stationary manner. There is thus no requirement of any flow through the sample container. Any temperature change can be directly attributed to the heat generated in the sample which is to be detected by the first and second heat transducer elements.

According to an embodiment, the first heat transducer element is mounted in a flipped configuration with respect to the second heat transducer element. One of the heat absorbing surfaces and one of the heat receiving surfaces can face the container surface and/or can be attached to the container surface. One of the heat absorbing surfaces and one of the heat receiving surfaces can face the heat sink. One of the heat absorbing surfaces and one of the heat receiving surfaces can be attached to the heat sink. If the heat absorbing and/or heat receiving surfaces are attached to the container surface, e.g. the container wall, heat is transferred to the heat receiving surfaces and/or heat absorbing surfaces predominantly through conduction. The heat transfer by conduction is particularly advantageous if a portion of the container covered by at least one of the heat absorbing or heat receiving surfaces corresponds to at least 50% of the container surface. More preferably the portion of the container covered by at least one of the heat absorbing or heat receiving surfaces corresponds to at least 65% of the container surface. Most preferred, the portion of the container covered by at least one of the heat absorbing or heat receiving surfaces corresponds to at least 80% of the container surface.

The container can be moved into the measuring position between the first and second heat transducer element freely, e.g. depending from a ceiling to which it is attached to. The container is configured such that it is adaptable to fit precisely into the gap formed by the first and second heat transducer element. In particular, the gap can be configured such that it is just a bit smaller than the space required by the container. Thereby an optimal contact between the the container and the first and second heat transducer element can be achieved.

The first and second heat transducer elements can include an insulating member which can be arranged between the heat sink and the container. The insulating member can be a thermally conductive element, which shows good electrical insulation properties. Each of the heat receiving surfaces and the heat absorbing surfaces can be contained in such an insulating member or can be configured as an insulating member. A heat receiving surface and a heat absorbing surface may be disposed with a wall thickness greater than zero. The heat absorbing surface can be a part of a heat absorbing plate. The heat absorbing surface can comprise a heat absorbing material. The heat receiving surface can be configured as a heat receiving plate. The heat receiving surface can comprise a heat receiving material. The heat absorbing surface can be a part of a heat absorbing plate. The heat absorbing surface can comprise a heat absorbing material. The heat receiving surface can be configured as a heat receiving plate. The heat receiving surface can comprise a heat receiving material.

A heat receiving material comprising the heat receiving surface and/or a heat absorbing material comprising the heat absorbing surface may have a wall thickness of up to 7 mm, preferably up to 5 mm more preferred up to 2 mm. The insulating member can be arranged directly next to the container surface, thus the container and the insulating member have a surface in common. The insulating member can touch the container surface. Each of the heat receiving surfaces and the heat absorbing surfaces can touch the container surface. The shape of any of the heat receiving and heat absorbing surfaces can correspond to the shape of the container surface.

The insulating member facing the heat sink can be arranged directly next to the heat sink, thus the heat sink and the insulating member have a surface in common. The insulating member can touch the heat sink surface. Each of the heat receiving surfaces and the heat absorbing surfaces can touch the heat sink surface. The shape of any of the heat receiving and heat absorbing surfaces can correspond to the shape of the heat sink surface.

In particular, the heat absorbing surface of one of the first and second heat transducer elements faces the outer container surface and the heat absorbing surface of the other of the first and second heat transducer elements faces the heat sink. This configuration allows according to an embodiment a heat flow from the first heat transducer through the container to the second heat transducer. The heat flow continues through the heat sink back to the first heat transducer. This configuration allows according to an embodiment a heat flow from the second heat transducer through the container to the first heat transducer. The heat flow continues through the heat sink back to the second heat transducer. The heat sink can operate as a damping element if a sample is introduced into the system which is too cold or to hot. Advantageously, the heat capacity of the heat sink is considerably larger than the heat capacity of the sample. Any of the first or second heat transducers, which are in particular configured as Peltier elements, can have a warmer and a colder surface. Under a warmer surface, it is intended a surface having a higher temperature than the environment. Under a colder surface, it is intended a surface having a lower temperature than the environment. The Peltier element is thus disposed with a polarity, which results in a positive, negative or neutral measured signal depending on its orientation in the calorimeter.

According to an embodiment, the electromotive forces generated by the first and second heat transducer elements are transformed in the detecting unit into an output voltage. Each of the first and second heat transducer elements can comprise a positive and a negative connector. Each of the positive and negative connectors can be configured to be connected to the heat absorbing and heat receiving surfaces. The electrical potential difference between the positive connector and the negative connector of the first heat transducer element results in a current to be obtained as the output the of first heat transducer element resulting from a heat flux from the container to the first heat sink. The current flows from the positive connector through an electric conduit, such as a wire to the detecting unit. Thus, the heat transfer elements provide a defined electrical configuration and a directed heat flow is generated through the heat transfer elements traversing the container containing the sample and a corresponding electrical signal is generated.

According to an embodiment, the first and second heat transducer elements are mounted in such a way that the currents produced by the non-zero Seebeck effect that occurs if the container and the first and second heat sinks are at the same temperature compensate each other.

According to an embodiment, the electromotive forces generated by the first and second heat transducer element are configured to be transformed into an output voltage in the detecting unit. The output voltage is according to this embodiment proportional to the heat flux. The detecting unit can comprise a first resistor R1 and a second resistor R2. The ratio of resistances of resistors R1/R2 can be used to adjust the output voltage if the temperature of the first heat sink and the second heat sink and the container is the same. If the output voltage can be adjusted by the ratio of resistances of resistors R1 and R2, a more easy stabilization is obtained as compared to the use of an offset voltage.

According to an embodiment, the detecting unit comprises a first resistor R1, a second resistor R2, an amplifier and a feedback resistor Rf, an electric conduit leading from a connector of the first heat transducer element to the first resistor R1 and an electric conduit leading from a connector of the second heat transducer element to the resistor R2, and the first resistor R1, the second resistor R2 and the feedback resistor Rf are connected to a negative input of the amplifier. The electric conduits from the connectors of the first and second heat transducer elements can be combinable in a collecting conduit at a summing point arranged downstream of the resistors R1, R2. According to an embodiment, the collecting conduit is received in a summing amplifier, such that an output voltage can be generated at the output of the summing amplifier. Thus the net currents arriving through R1 and R2 from the first and second heat transducer elements at the summing point are converted to an output voltage at the output of the amplifier. In particular, the resistances of the first and second resistors R1 and R2 are adjustable, whereby the currents from the electric connectors of the first and second heat transducer elements are compensated at the summing point. If therefore, the heat transducer elements are arranged in a flipped position the heat flowing into the container through one of the heat transducer elements and the heat leaving the container through the other heat transducer element generates no output voltage. In fact, the output voltage generated at the first heat transducer element has the same absolute value as the output voltage generated by the second heat transducer element if the first and second heat transducer elements are exactly the same. Thus, the throughput of heat is not detected. If the first and second heat transducer elements differ slightly from each other with respect to their non-zero Seebeck effect, a differential output voltage will be detected by the detecting unit. This differential output current can be compensated by adjusting the resistance of at least one of the resistors R1, R2.

When performing a measurement with a calorimeter according to any of the embodiments, the current from the first heat transducer element and the current from the second heat transducer element are thus summed up when using a detecting unit according to any of the preceding embodiments. Due to the fact, that one of the resistors R1, R2 is electrically connected to the positive connector and the other of the resistors R1, R2 is connected to a negative connector, the current flows in opposite senses in the electrical conduits leading to the resistors R1, R2. By summing up these currents of opposite sense at the summing point, which is arranged between the resistors R1, R2 and the input of the amplifier, a difference of the current from the first heat transducer element and the opposite current from the second heat transducer element is obtained. The resulting current from the summing point is fed into the input of the amplifier, thereby generating an output voltage that compensates these currents through the feed back resistor Rf. The output voltage corresponds to the heat generated by the sample in the container. Thereby, the non-zero Seebeck currents are canceled out, such that the calorimeter is capable of measuring very low heat fluxes without having to compensate electronically the non zero Seebeck effect.

The resistance of the resistors R1 or R2 should according to an embodiment be very low and can be zero Ohm. Thereby it is possible to measure the entire current produced by at least one of the first and second heat transducer elements. The ratio of the resistors R1/R2 can be used to finetune the zero output voltage baseline obtained when the container and heat sink are all kept at the same temperature and no heat is produced anywhere in the system.

The first and second heat transducer elements emit a standby current. The standby current generated by the first heat transducer element most likely differs from the standby current of the second heat transducer element if a sample without energy source is used. A calibration can be performed by adjustment of the resistances of resistors R1, R2 to compensate for any deviations of the standby currents provenient from the first heat transducer element with respect to the second heat transducer element due to manufacturing differences. If the calibration is not performed, a standby current would be measured in addition to the current resulting from the heat flux, whereby the measurement value of the heat flux of the sample to be detected in operation would be influenced.

In accordance with the principles of isothermal microcalorimetry, the temperature of the environment is advantageously kept constant. According to an embodiment, the preferred temperature is 37° C.

According to an embodiment any of the first or second heat transducer elements can comprise a heat flow detector, which can include a semiconductor. The heat transducer element can comprise a layer including a conductive p material, and a layer including a conductive n-material arranged next to each other. Each of the layers including conductive p materials or layers including conductive n materials may comprise a semiconductor. By a heat transfer resulting from a heat flux, an electron flow is induced. The electron flow is collected by the electrical connectors arranged at two opposite ends of each layer including p-type conductive materials and each layer including n-type conductive materials. In the layer containing the p-type conductive materials, the electrons progress in one direction e.g. from the container to the heat sink. The electrons are conducted by an intermediate connector to the next layer containing the n-type conductive materials. The electrons are blocked and can only pass on, if they acquire sufficient energy to be able to be transferred over or across the layer including n-type conductive materials. The heat sink can form a reservoir for this energy, therefore a heat flux from the heat sink to the connector leads to a gain in energy for the electrons, which can pass the layer including n-type conductive materials to be transported to a subsequent layer including p-type conductive materials in case a plurality of such layers are interconnected in a stack.

If the stack covers a large surface portion of the container, substantially all heat generated in the container is transferred through the stack to the heat sink.

For the operation of the calorimeter according to any of the embodiments an energy source can be provided in the container. The container can contain a sample. According to an embodiment, the sample can contain an energy source, such that heat can be generated by said energy source to provide the heat flux. The heat flux generated by the energy source is detectable by at least one of the first and second heat transducer elements and the detecting unit.

In turn, the calorimeter can be used to detect the presence of the energy source in the sample, which is detectable by a deviation from the expected heat flux in a container not containing an energy source or containing a reference energy source. Due to the fact, that any differential heat flow results in an output voltage, the presence of the energy source is detectable by comparing the actual output voltage to the expected output voltage of a reference sample not containing an energy source or a reference energy source.

The deviation from the expected heat flux results in a deviation of the detected output voltage, such that a difference between the detected output voltage and an expected output voltage is obtainable. The difference between the detected output voltage and an expected output voltage is proportional to the heat flux resulting from the energy source in the sample. In addition, the presence of the energy source in the sample can thus be detected by the deviation of the detected output voltage from the expected output voltage of a reference sample not containing an energy source or containing a reference energy source.

In particular, the energy source comprises a chemical reaction, which can be one of an exothermic chemical reaction or an endothermic chemical reaction. The heat flux is increased by the energy source, if the energy source generates energy. The heat flux is decreased by the energy source if the chemical reaction is an endothermic chemical reaction. In particular, the occurrence of the chemical reaction results in a heat flux which is detectable in the sample. By an arrangement of a calorimeter according to any of the embodiments in the regime of an isothermal microcalorimetry a heat flux of in the nanowatt or picowatt range can be detected.

A method for measuring a heat flux with a calorimeter, comprises the step of measuring a deviation from an expected heat flux to a measured heat flux attributable to a heat source in the sample. The measurement can be completed in less than 8 hours, preferably less than 4 hours, most preferred less than 2 hours, which requires that the instrument gets into a thermally stable condition as fast as possible. The thermally stable condition can be reached faster, if a constant temperature is maintained not only during the measurement, but also before the measurement and thereafter. For biological processes, preferably a temperature of 37° C. can be used. The temperature can be kept constant by the use of at least one, preferably multiple insulating layers protecting the calorimeter, in particular, the container, the sample, the heat sinks, the heat transducer elements. In order to eliminate temperature effects from the detecting unit, also the detecting unit can be contained in the insulation. To keep the temperature constant, advantageously, the temperature of the detecting unit can be controlled.

In particular, a deviation from the expected heat flux results in a deviation of the detected electrical potential, such that a potential difference between the detected electrical potential from an expected electrical potential is obtained. The expected electrical potential can correspond to a zero output voltage, if the calibration as previously described is performed prior to the measurement.

The embodiments further relate to the use of a calorimeter according to any of the preceding embodiments for detecting the presence of an energy source, such as a chemical reaction or biological processes, pathogens, cells, e.g. tumorous cells, or microorganisms, such as bacteria, viruses or funghi in a sample. The sample can be liquid, solid or gaseous. The sample can be solid, opaque or transparent. For instance, the sample can be one of blood, blood cells, blood products, platelets, blood plasma, synovial fluids, sperm, cerebrospinal fluid or urine. The sample processed can be recovered and subjected to additional analyses as the sample remains almost undisturbed during the measurement.

An advantage of the calorimeter according to the invention is that the calorimeter can be manufactured in a simple manner and at reduced costs as compared to prior art calorimeters. A further advantage of the calorimeter is the availability of the results of the tests performed therewith within the time span of at most 8 hours, depending on the concentration and growth-rate of the micro-organism, which allows for a rapid pre-screening of a multitude of samples. Furthermore, the calorimeter can dispense with any reference sample. A reference sample is not needed as the current difference is measured. The calorimeter just requires a single initial calibration to compensate for any manufacturing differences between the first and second heat transducer elements.

Considering a detection limit of 200 μW of heat production about a 100000 bacteria are needed to reach the detection limit according to Braissant et al. "Isothermal Microcalorimetry for the Investigation of Clinical Samples: Past and Present", chapter 19, pages 356, 357. Considering a range of 0.01 pW/cell up to 329 pW/cell for the heat production rate, the sample size could range from about 1000 to 20 million cells if a detection limit of 200 nW is considered.

Apart from the advantage of a rapid screening of a multitude of samples, sample data can be analyzed with a growth model to allow the rapid determination of the sample's growth rate. As already pointed out by Braissant et al., the heat production pattern could be used to identify the pathogen. In addition, a comparison between untreated samples and samples added with different compounds allows for instance a rapid comparison of the efficacy of a molecule against a given pathogen or cancer type to evaluate the activity of a new compound or a microorganism or a cell in vitro.

BRIEF DESCRIPTION OF THE DRAWINGS

A number of embodiments are shown in the subsequent drawings.

DETAILED DESCRIPTION

Figure 1:
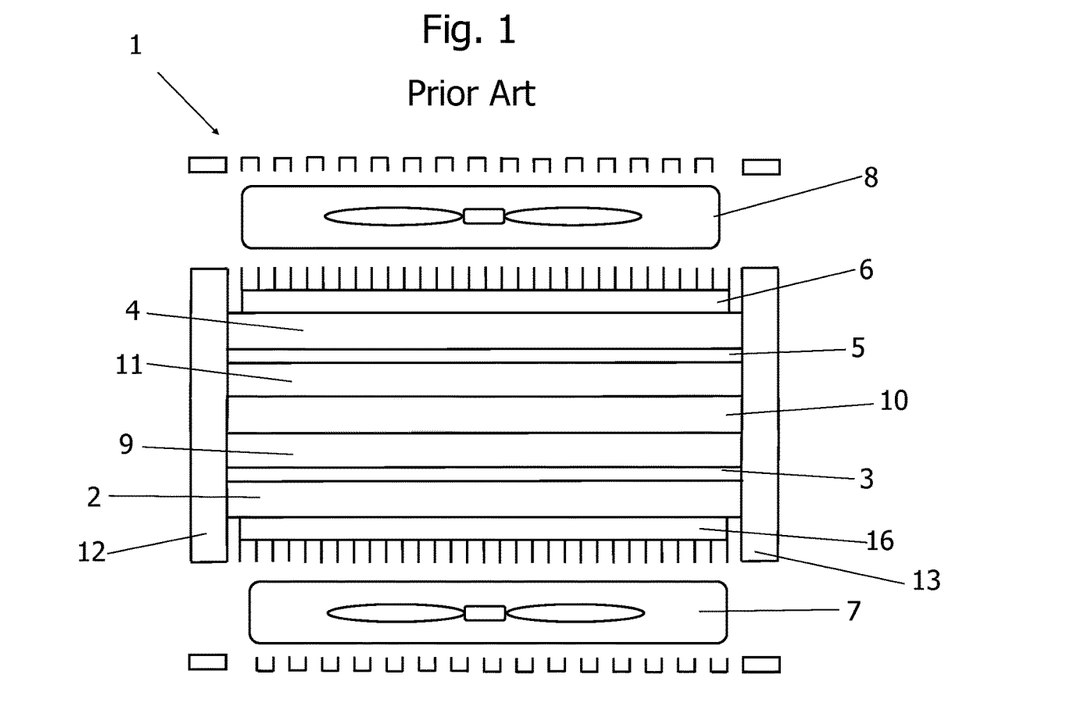
FIG. 1 shows an arrangement of a calorimeter according to the prior art.

FIG. 1 shows an arrangement of a calorimeter of the prior art, such as the calorimeter disclosed by McKinnon et al. The calorimeter according to FIG. 1 consists of a stack of components 1, a hot plate 2, a cold plate 4 a first sample 9, a second sample 11 and a heat flux transducer 10 sandwiched between the first sample 9 and the second sample 11.

The hot plate 2 is fabricated from 40 mm by 40 mm by 4 mm peltier plate. One face of the hot plate 2 is attached to a heat sink 16 which can be cooled by a fan 7 on one face and to a copper plate 3 on the other face. The copper plate 3 can have the same surface of 40 mm by 40 mm and a thickness of 1 mm. The cold plate 4 is fabricated from 40 mm by 40 mm by 4 mm peltier plate. One face of the cold plate 4 is attached to a heat sink 6 which can be cooled by a fan 8 on one face and to a copper plate 5 on the other face. The copper plate 5 can have the same surface of 40 mm by 40 mm and a thickness of 1 mm. The polarity of the peltier plate forming the hot plate 2 is reversed with respect to the polarity of the peltier plate forming the cold plate 4.

The heat flux transducer 10 placed between the hot and cold plates 2, 4 is configured as a Peltier plate. Each of the hot and cold plates 2, 4 is equipped with a DC power supply to control the Peltier plates for cooling. By variation of the DC supply to the hot plate 2 temperature differences are obtained. A heat transfer occurs from the lower hot plate 2 through the copper plate 3, the sample 9, the heat flux transducer 10, the sample 11, the copper plate 5 and the cold plate 4. The stack of components is housed in a cladding made of expanded polystyrene, shown as lateral walls 12, 13 in FIG. 1.

The heat flux transducer 10 is also referred to as a Seebeck module. The heat-flux transducer can be configured as a bismuth-telluride module (BTM). The bismuth-telluride module contains an alloy of bismuth and telluride. In analogy to bimetallic thermocouples, a BTM exhibits electrical properties when a thermal gradient is applied transversely through the material. A single semiconductor pellet produces approximately four times the output of a single K type thermocouple junction, which is known as the Seebeck effect. A BTM with the overall dimensions of 40 mm by 40 mm by 4 mm thereby generates a potential of 15 Volt and a current of 4 amp.

The Seebeck module is responsible for creating the so-called Seebeck effect, a voltage gradient resulting from the temperature gradient. The voltage gradient obtained from measurement of the voltage of the Seebeck module can be digitized and logged or conditioned with an operational amplifier before digitizing. The midrange unamplified signal mean was 270 +/−2 mV whereas the midrange unamplified signal mean was 1300 +/−1.4 mV. The temperature differences have been increased incrementally and the Seebeck outputs have been recorded. In case an expanded EPS sample with a thickness of 25 mm with a density of 10.7 kg/m$^3$ is used as sample 9, 11 in the configuration as shown in FIG. 1, it is observed that the Seebeck voltage increases roughly linearly with the temperature difference according to an equation correlating the voltage y with the temperature difference x: y=kx+d with k=4.2436 and d=64,41. The slope coefficient k is small due to the insulating properties of expanded polystyrene. These extremes approach the limits expected for materials of a very high thermal conductivity (about 1 W/mK) and those of a very low thermal conductivity (about 0 W/mK). Between these extremes, there is ample sensitivity to characterize the thermal properties of building materials displaying a wide range of thermal conductivities. This prior art arrangement requires the provision of heat to the hot plate and the heat transfer from the hot plate via the sample to the cold plate. The heat transfer is proportional to the insulating characteristics of the sample. The apparatus of Mc Kinnon thus compares this heat transfer to reference samples of known insulating characteristics. However the apparatus would not detect the presence of a heat source in the sample. Should a heat source be present in the sample the heat flux measured by the heat flux transducer is expected to increase. However it is not possible to obtain an information from the result itself if the sample has different insulating characteristics because of its material properties or if the result is to be attributed to a heat source present in the sample. Therefore, the calorimeter of Mc Kinnon is not suitable for providing information about a heat source in a sample.

Figure 2:
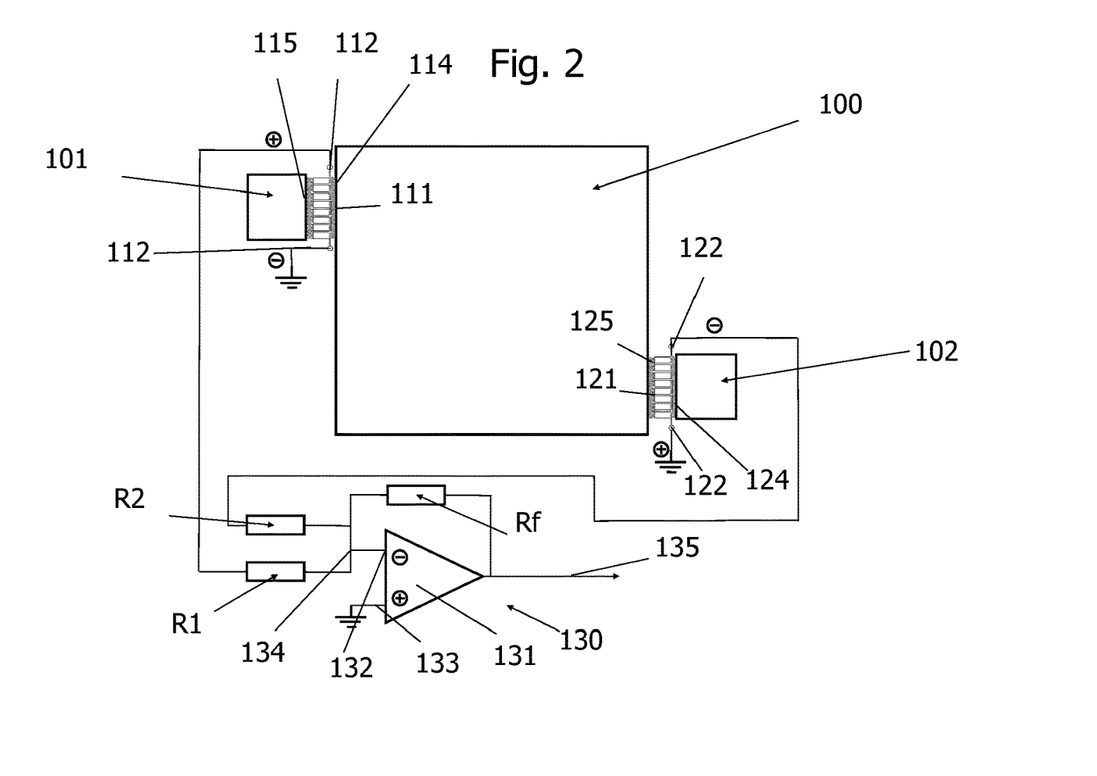
FIG. 2 an arrangement of a calorimeter according to a first embodiment of the invention, FIG. 3 an arrangement of a calorimeter according to a second embodiment of the invention, FIG. 4 a detail of the first heat sink according to one of the previous embodiments, FIG. 5 a detail of the second heat sink according to one of the previous embodiments, FIG. 6 a detail of a heat transducer.

FIG. 2 shows an arrangement of a calorimeter according to a first embodiment of the invention. The calorimeter according to FIG. 2 comprises a container 100, a first heat sink 101, a second heat sink 102. The container is thermally insulated, such that a heat transfer substantially occurs through the heat transducer elements 111, 121 between the container 100 and the first heat sink 101 or the second heat sink 102.

The container can receive a sample volume of less than 500 microliters, advantageously less than 350 microliters, more preferred less than 200 microliters. For specific applications, the sample volume can be 1 microliter or less. Such a sample size may be required for animal healthcare. A possible field of application are for instance animal urinal measurements. The values, ranges of values, materials mentioned in this application are exemplary. Equivalents, alternatives, modifications, deviations apparent to the skilled person in the art are contemplated and considered to be comprised within the scope of the disclosed invention. For instance, the container can have a shape comprising at least one element of the group comprising a cylinder, a cone, a frustrum of a cone, a prism, a parallelepiped, a pyramid, a container of rectangular or square cross-section.

Figure 6:
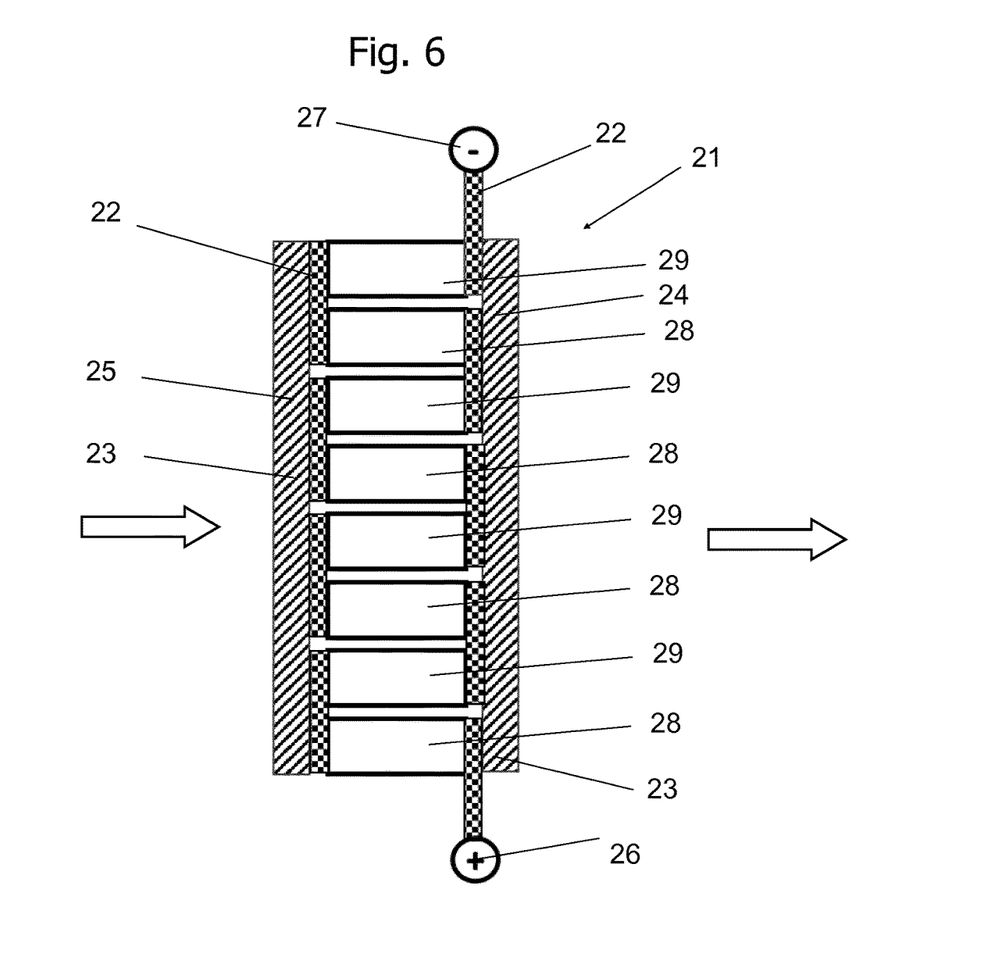

The first heat sink 101 comprises a first heat transducer element 111 comprising a heat receiving surface 114 facing the container wall and a heat absorbing surface 115. The first heat transducer element 111 is disposed with electrical connectors 112. The electrical connectors 112 can comprise a positive connector 116 and a negative connector 117 as shown in greater detail in FIG. 4. The first heat transducer element 111 can comprise a stack of p-n layers, thus layers including a p-type conductive material, and layers including a n-type conductive material, thereby forming a thermopile for instance as shown in FIG. 6.

In this embodiment, the heat receiving surface 114 is arranged in proximity to the wall of the container 100, in particularly it can be in contact with the container wall. The first heat transducer element 111 receives or transmits a heat flux from/to the heat sink 101 through the heat absorbing surface 115. The heat flux is transformed in the heat transducer element 111 into an electric current, as a potential difference is generated between the stack of p-n conducting layers due to the energy supply from the heat flux. According to this embodiment, negative connector 117 is connected to earth as shown in detail in FIG. 4. The positive connector 116 is connected by an electrical conduit, such as wire, to a resistor R1.

The second heat sink 102 is disposed with a first heat transducer element 121 comprising a heat receiving surface 124 facing the second heat sink 102 and a heat absorbing surface 125 facing the container wall. Advantageously, the heat absorbing surface 125 is in contact with the container wall. The second heat transducer element 121 is disposed with electrical connectors 122. The electrical connectors 122 can comprise a positive connector 126 and a negative connector 127 as shown in greater detail in FIG. 5. The second heat transducer element 121 can comprise a stack of layers including a p-type conductive material, and layers including a n-type conductive material, thereby forming a thermopile for instance as shown in FIG. 6.

In this embodiment, the heat absorbing surface 125 is arranged in proximity to the wall of the container 100, in particular, it can be in contact with the container wall. The second heat transducer element 121 receives or transmits a heat flux from/to the container 100 through the heat absorbing surface 125. The heat flux is transformed in the second heat transducer element 121 into an electric current, as a potential difference is generated between the stack of layers including a p-type conductive material, and layers including a n-type conductive material due to the energy supply or energy drain from the heat flux. According to this embodiment, the positive connector 126 is connected to earth as shown in detail in FIG. 4. The negative connector 127 is connected by an electrical conduit, such as wire, to a resistor R2.

The resistors R1 and R2 are arranged in parallel arrangement with respect to each other. Resistor R2 is connected to the negative connector 127 of the second heat transducer element 121 and resistor R1 is connected to the positive connector 116 of the first heat transducer element 111. For this reason, the first heat sink 101 is mounted in an antiparallel mounting with respect to the second heat sink 102. The output currents of resistor R1 and resistor R2 are collected and added in summing point 134. An electrical conduit is provided from the summing point 134 to a negative input 132 of an amplifier 130. The combined output current from summing point 134 is introduced through the electrical conduit into the amplifier 130 via the negative input 132. Due to the fact, that the current leaving resistor R1 has the opposite direction as compared to the current leaving resistor R2, the difference of these two currents is obtained in the summing point 134. The resulting current may be zero Amperes, if the current from R1 and the current from R2 have the same absolute value. The ohmic resistance of each of resistors R1 or R2 is adjusted by calibration as previously mentioned, such that the non-zero Seebeck currents are canceled out. Therefore, the antiparallel mounting of the first and second heat sinks 101, 102 of the calorimeter of the invention results in an elimination of the non-zero Seebeck currents which have to be dealt with by any calorimeter according to the prior art. The resistor Rf is used in the current to voltage conversion of the amplification process.

The summing amplifier 130 generates an output voltage 135 which corresponds to the heat flux generated in container 100. The summing amplifier 130 comprises a positive input 133, which is connected to earth. The use of the summing amplifier 130 makes it possible to reliably detect very small heat flows, such as those emitted any type of chemical reaction or biological process or metabolism, e.g. by cell activity, pathogens or viruses, funghi, bacteria. The heat flux can be registered for a certain time period and may be characteristic to a certain phenomenon. Therefore, the location of the peaks in the heat flux curve can be used to detect the species of pathogens, cells, viruses, funghi or bacteria present in the sample in the container. Therefore, the calorimeter is not only useful to detect the presence of an energy source in the sample, it can be also useful also to determine the type of heat source, e.g. the species of pathogens, cells, viruses, funghi or bacteria responsible for the heat generation.

Figure 3:
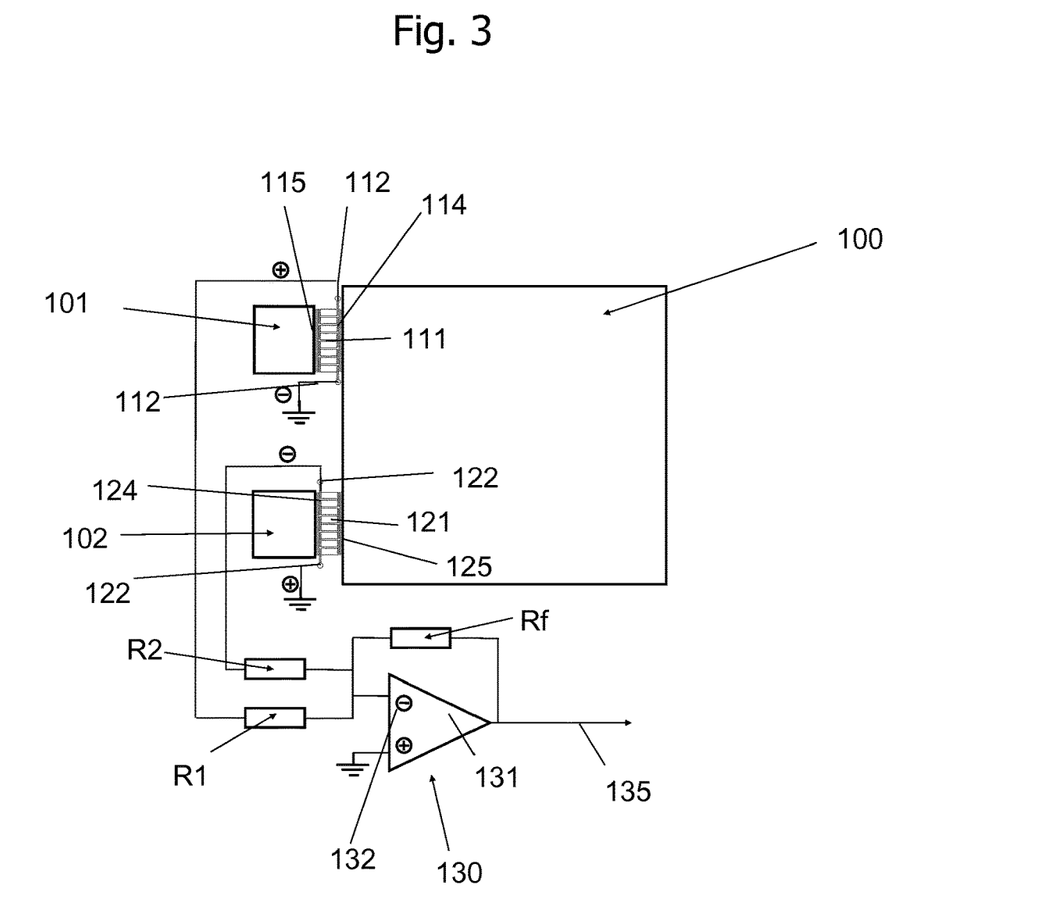

The embodiment according to FIG. 3 differs from the previous embodiment in the configuration of the first heat sink 101 with respect to the second heat sink 102. The first heat sink 101 and the second heat sink 102 are arranged on the same side of the container 100. In the embodiment of FIG. 3 the same reference numbers are used for the same parts as in FIG. 2. In the embodiment of FIG. 2 the first heat sink 101 is arranged at a different side of the container 100 with respect to the second heat sink 102. According to the embodiment of FIG. 3 the first heat sink 101 is arranged on the same side of the container as the second heat sink 102.

Figure 4:
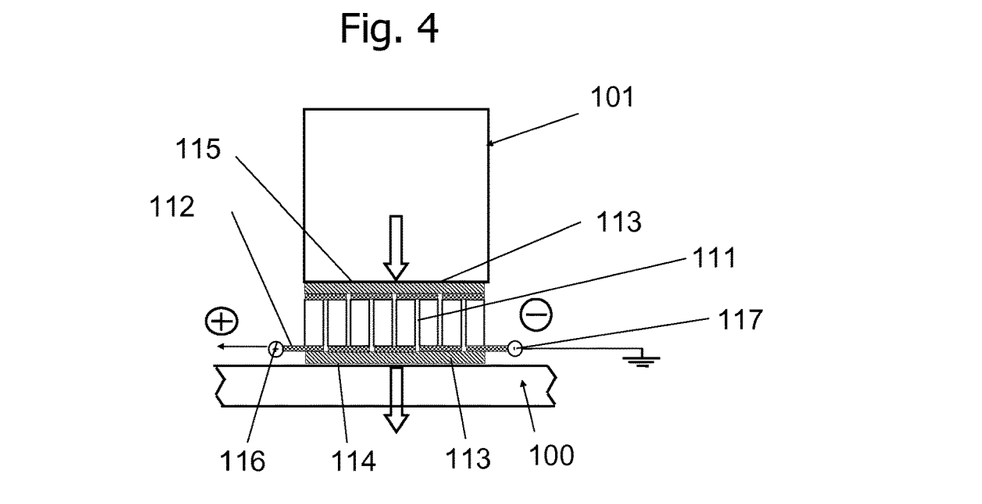

FIG. 4 shows a detail of the first heat sink 101 including the first heat transducer element 111 according to the invention. The heat transducer element 111 comprises a heat absorbing surface 115. The first heat sink 101 is in contact with the heat absorbing surface 115 so to allow for a heat transfer from the heat sink 101 to the first heat transducer element 111. The first heat transducer element 111 comprises a heat receiving surface 114. The heat receiving surface 114 is in contact with a wall of the container 100. The heat receiving surface 114 and the heat absorbing surface 115 are configured as a thermally conductive electric insulator 113. A stack layers including a p-type conductive material and layers including a n-type conductive material is arranged between the heat absorbing surface 115 and the heat receiving surface 114 so as to transform e.g. the heat flux from the heat absorbing surface 115 to the heat receiving surface 114 into an electric current. The two outermost conductors are connected to end connectors 116, 117 leading to an electrical conduit. The end connector 116 is a positive connector, the end connector 117 is a negative connector. In FIG. 4 the negative connector 117 is connected to earth. The container wall can have any orientation in space, the orientation is not limited to the vertical arrangement as shown in FIG. 4. This means that the first heat transducer element 111 can be attached to a vertical container wall, an inclined wall or a horizontal container wall, for instance a container bottom wall.

Figure 5:
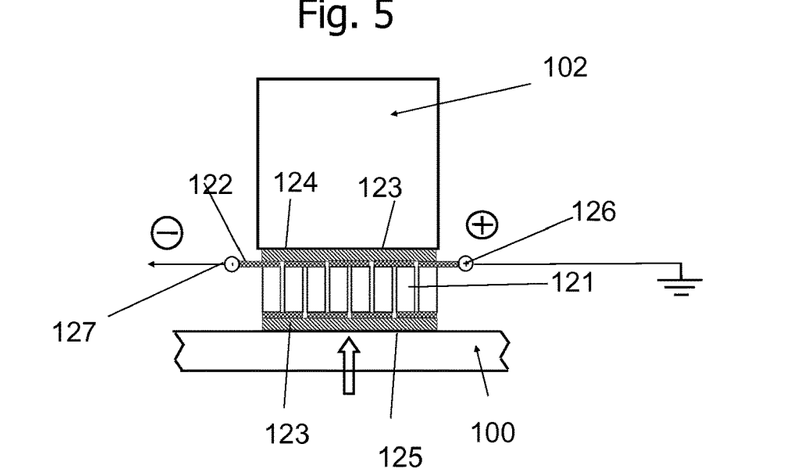

FIG. 5 shows a detail of the second heat sink 102 including the second heat transducer element 121 according to the invention. The heat transducer element 121 comprises a heat absorbing surface 125. The second heat transducer element 121 comprises a heat receiving surface 124. The second heat sink 102 is in contact with the heat receiving surface 124 so to allow for a heat transfer from the second heat transducer element 121 to the heat sink 102. The heat absorbing surface 125 is in contact with a wall of the container 100. The heat receiving surface 124 and the heat absorbing surface 125 are configured as a thermally conductive electric insulator 123. A stack of layers including a p-type conductive material and layers including a n-type conductive material is arranged between the heat absorbing surface 125 and the heat receiving surface 124 so as to transform the heat flux from the heat absorbing surface 125 to the heat receiving surface 124 into an electric current. The two outermost conductors are connected to end connectors 126, 127 leading to an electrical conduit. The end connector 126 is a positive connector, the end connector 127 is a negative connector. In FIG. 5 the positive connector 126 is connected to earth.

FIG. 6 shows an example of a heat transducer element 21 which can be the same as the first and second heat transducer elements 111, 121 used in the previous embodiments. The heat transducer element thereby operates as a heat-flow sensor. The heat transducer element is an electromotive force (emf) producing element being disposed with an internal resistor R. It transforms the heat-flow into electric power (voltage and/or current). By placing the detecting unit including all electrical conduits within the temperature stabilized space of the calorimeter any temperature dependent effects of any of the components forming the detecting unit can be eliminated. The heat transducer element 21 comprises a heat receiving surface 24 and a heat absorbing surface 25. The heat receiving surface 24 and the heat absorbing surface can be in contact with a wall of the container 100 or with a heat sink such as the heat sinks 101, 102 of any of FIG. 2-5.

The heat receiving surface 24 and the heat absorbing surface 25 comprise a thermally conductive electric insulator 23. A stack of layers including a p-type conductive material, and layers including a n-type conductive material is arranged between the heat absorbing surface 25 and the heat receiving surface 24 so as to transform the heat flux from the heat absorbing surface 25 to the heat receiving surface 24 into an electric current. The layer including a p-type conductive material and the layer including a n-type conductive material are advantageously arranged in an alternate arrangement in a stack, thus a layer including a p-type conductive material is followed by a layer including a n-type conductive material and vice versa. The layer including a p-type conductive material 28 and the layer including a n-type conductive material 29 are connected by electric connectors 22 in such a way that the layer including a p-type conductive material 28 is always connected to a layer including a n-type conductive material 29 and a layer including a n-type conductive material 29 is always connected to a layer including a p-type conductive material 28. The two outermost conductors 22 are connected to end connectors 26, 27 leading to an electrical conduit. When operated as a sensor an applied heat-flux from the heat absorbing surface 25 to the heat receiving surface 24, the heat absorbing surface 25 is heated and the heat receiving surface 24 is cold, thereby a negative current is generated. A positive current is obtained if the heatflow is reversed.

When operated as a Peltier element, an applied positive current generates a heat-flow from heat absorbing surface 25 to heat receiving surface 24, thereby it cools the heat absorbing surface 25.

According to a further embodiment, the heat transducer element can be configured as a thermistor. The thermistor may include a semiconductor material, e.g. a metallic oxide of manganese, nickel, cobalt, copper, uranium, iron, zinc, titanium, barium, magnesium. The temperature coefficient is determined by the properties of oxides in the mixture. The thermistor comprises a bead or rod and the first and second electrically conductive surfaces may be configured as electrical leads, in particular bifilar leads including an electrically conductive material, such as copper.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of an element or compound selected from the group consisting of A, B, C . . . and N, the text should be interpreted as requiring only one element from the group, not A plus N, or B plus N, etc.

The invention claimed is:

1. A calorimeter for measuring a heat flux of a sample, the calorimeter comprising a container, a first heat sink and a second heat sink wherein the sample is arranged in the container, wherein the first heat sink and the second heat sink are arranged at a distance from each other on the container, wherein the first heat sink comprises a first heat transducer element and the second heat sink comprises a second heat transducer element, wherein each of the first and the second heat transducer elements comprise a heat receiving surface and a heat absorbing surface configured to generate an electromotive force equivalent to the heat flux to or from either the first heat sink or the second heat sink to be sent to a detecting unit for obtaining an electrical potential representing the heat flux leaving or traversing the container, wherein the electromotive forces generated by the first and second heat transducer element are configured to be transformed into an output voltage in the detecting unit, wherein the detecting unit comprises a first resistor R1 and a second resistor R2, and wherein the ratio of resistances of the first resistor R1 and the second resistor R2 is configured to adjust the output voltage if the temperature of the first heat sink and the second heat sink and the container is the same, wherein the output voltage is proportional to the heat flux.

2. The calorimeter according to claim 1, wherein the first heat transducer element is mounted in a flipped configuration with respect to the second heat transducer element.

3. The calorimeter according to claim 1, wherein the first and the second heat transducer elements are configured to compensate currents produced by a non-zero Seebeck effect that occurs if the container and the first and the second heat sinks are at a same temperature.

4. A calorimeter according to claim 1, wherein the heat absorbing surface of one of the first and the second heat transducer elements faces an outer container surface and the heat absorbing surface of the other of the first and the second heat transducer elements faces the heat sink.

5. The calorimeter according to claim 1, wherein the output voltage is proportional to the heat flux.

6. The calorimeter according to claim 1, wherein the detecting unit comprises the first resistor R1, the second resistor R2, an amplifier and a feedback resistor Rf, a first electric conduit leading from a first connector of the first heat transducer element to the first resistor R1 and a second electric conduit leading from a second connector of the second heat transducer element to the resistor R2, and the first resistor R1, the second resistor R2 and the feedback resistor Rf are connected to a negative input of the amplifier.

7. The calorimeter according to claim 6, wherein the first electric conduit from the first connector of the first heat transducer element and the second electric conduit from the second connector of the second heat transducer element are combinable in a collecting conduit at a summing point arranged downstream of the resistors R1, R2.

8. The calorimeter according to claim 7, wherein the first and the second resistors R1 and R2 are adjustable, wherein currents from the first connector and the second connector of the first heat transducer element and the second heat transducer element, respectively, are compensated at the summing point.

9. The calorimeter according to claim 1, wherein a temperature of the first heat sink is different from a temperature of the second heat sink in response to the sample containing an energy source for producing or absorbing heat, wherein an energy source heat flux generated by the energy source is detectable by at least one of the first and the second heat transducer elements and the detecting unit.

10. The calorimeter according to claim 1, comprising a plurality of containers, each of the plurality of containers comprising respective first and second heat sinks.

11. A method of detecting presence of an energy source in a sample arranged in a container of a calorimeter, the calorimeter comprising a first heat sink and a second heat sink, wherein the first heat sink and the second heat sink are arranged at a distance from each other on the container, wherein the first heat sink comprises a first heat transducer element and the second heat sink comprises a second heat transducer element, wherein each of the first and the second heat transducer elements comprise a heat receiving surface and a heat absorbing surface, the method comprising:

generating an electromotive force equivalent to a measured heat flux to or from either the first heat sink or the second heat sink;

providing the electromotive force to a detecting unit to obtain an electrical potential representing the measured heat flux leaving or traversing the container; and measuring a deviation from an expected heat flux to the measured heat flux to detect the presence of the energy source in the sample, wherein the electromotive forces generated by the first and second heat transducer element are transformed into an output voltage in the detecting unit, wherein the detecting unit comprises a first resistor R1 and a second resistor R2, and wherein the ratio of resistances of the first resistor R1 and the second resistor R2 is configured to adjust the output voltage if the temperature of the first heat sink and the second heat sink and the container is the same, wherein the output voltage is proportional to the heat flux.

12. The method according to claim 11, wherein the energy source includes at least one of a chemical reaction, a microorganism, a pathogen, and a cell.

13. The method according to claim 11, wherein the measuring is performed within a predetermined period of time.

* * * * *